(12) United States Patent  
Cominelli et al.

(10) Patent No.: US 8,877,276 B2
(45) Date of Patent: Nov. 4, 2014

(54) BEVERAGE MAKING METHOD HAVING LIQUID DELIVERY TANK WITH EXPANSION CHAMBER

(71) Applicant: Keurig, Incorporated, Reading, MA (US)

(72) Inventors: Tom Cominelli, Gloucester, MA (US); James E. Shepard, Marbehead, MA (US); Thomas Vitella, Sandown, NH (US)

(73) Assignee: Keurig Green Mountain, Inc., Waterbury, VT (US)

( * ) Notice: Subject to any disclaimer, the term of this patent is extended or adjusted under 35 U.S.C. 154(b) by 0 days.

(21) Appl. No.: 14/162,878

(22) Filed: Jan. 24, 2014

(65) Prior Publication Data

US 2014/0141142 A1    May 22, 2014

Related U.S. Application Data

(62) Division of application No. 13/370,005, filed on Feb. 9, 2012, now Pat. No. 8,667,892.

(51) Int. Cl.
*A47J 31/46* (2006.01)
*A47J 31/54* (2006.01)
*A23F 3/18* (2006.01)
*A23F 5/26* (2006.01)

(52) U.S. Cl.
CPC *A47J 31/46* (2013.01); *A47J 31/54* (2013.01); *A23F 3/18* (2013.01); *A23F 5/262* (2013.01)
USPC ............ 426/431; 426/433; 426/435; 426/477

(58) Field of Classification Search
USPC .................. 426/433, 431, 435, 477
See application file for complete search history.

(56) References Cited

U.S. PATENT DOCUMENTS

| | | | | |
|---|---|---|---|---|
| 2,192,095 | A * | 2/1940 | Myers | 99/281 |
| 3,463,075 | A * | 8/1969 | Wickenberg | 99/282 |
| 3,958,502 | A * | 5/1976 | Vitous | 99/300 |
| 4,359,174 | A * | 11/1982 | Ikunosuke et al. | 222/131 |
| 4,793,246 | A * | 12/1988 | Barradas | 99/307 |
| 5,404,794 | A * | 4/1995 | Patel et al. | 99/280 |
| 6,074,565 | A * | 6/2000 | Buckner | 210/764 |
| 6,090,281 | A * | 7/2000 | Buckner | 210/205 |
| 6,094,524 | A * | 7/2000 | Riley | 392/485 |
| 6,490,870 | B1 * | 12/2002 | Efremkine | 62/3.64 |
| 7,032,503 | B2 * | 4/2006 | Cai | 99/286 |
| 7,398,726 | B2 | 7/2008 | Streeter et al. | |
| 2005/0041962 | A1 * | 2/2005 | Moulder | 392/466 |

(Continued)

FOREIGN PATENT DOCUMENTS

WO    WO 2008120991 A1    10/2008

OTHER PUBLICATIONS

International Search Report and Written Opinion of the International Searching Authority in PCT/US2013/024590, Mailed Feb. 4, 2013.

*Primary Examiner* — Anthony Weier
(74) *Attorney, Agent, or Firm* — Wolf, Greenfield & Sacks, P.C.

(57) ABSTRACT

A beverage forming method and system employing the introduction of air into the heater tank and/or an expansion chamber after liquid delivery is complete. An expansion chamber may be provided at the top of the heater tank and provide a tortuous flow path from an air inlet to the tank outlet.

13 Claims, 5 Drawing Sheets

(56) References Cited

U.S. PATENT DOCUMENTS

| | | | |
|---|---|---|---|
| 2008/0041234 A1* | 2/2008 | Cortese | 99/290 |
| 2008/0236403 A1* | 10/2008 | Cortese | 99/323 |
| 2008/0250936 A1* | 10/2008 | Cortese | 99/295 |
| 2009/0120299 A1* | 5/2009 | Rahn et al. | 99/279 |
| 2010/0024658 A1 | 2/2010 | Jacobs et al. | |
| 2014/0230658 A1* | 8/2014 | Ozanne et al. | 99/300 |

* cited by examiner

BEVERAGE MAKING METHOD HAVING LIQUID DELIVERY TANK WITH EXPANSION CHAMBER

CROSS REFERENCE TO RELATED APPLICATIONS

This application is a divisional of and claims the benefit under 35 U.S.C. §121 of U.S. patent application Ser. No. 13/370,005, entitled "LIQUID DELIVERY TANK WITH EXPANSION CHAMBER," filed Feb. 9, 2012, which is herein incorporated by reference to the maximum in its entirety.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application publication 2008/0134902 discloses a beverage forming system that heats water in a reservoir and pneumatically delivers the heated water to a brew chamber for making a coffee drink or other beverage. U.S. Pat. No. 7,398,726 discloses another beverage forming system that delivers heated water from a dispensing tank to a brew chamber by pneumatic forcing of the water from the metering tank. U.S. Patent Application publications 2009/0120299 and 2008/0092746, and U.S. Pat. Nos. 3,511,166, 3,958,502, 4,602,145 and 4,263,498 disclose other system types in which water in a heater tank or heat exchanger is forced to flow out of the tank and to a beverage making station by introducing unheated water into the tank/exchanger.

SUMMARY OF INVENTION

Some aspects of the invention relate to arrangements for helping to prevent unwanted discharge of water or other liquid from a heater tank, e.g., due to expansion of the liquid in the tank during heating. This problem may be encountered with systems that deliver water from a heater tank by introducing additional water into the tank so as to force heated water to a brew chamber or other section to form a beverage. For example, in some systems, a heater tank may be full of heated water such that the hottest water is located near a top of the tank. To deliver heated water from the tank, cold water may be introduced at an inlet located near the bottom of the tank. The addition of cold water to the tank may displace heated water in the tank, causing the heated water to exit the tank, e.g., at an outlet near the top of the heater tank. This type of system can be very effective, and can deliver precise volumes of water, e.g., where the volume of cold water delivered to the heater tank can be closely controlled.

However, such systems can be susceptible to unwanted delivery of water from the heater tank due to thermal expansion. This unwanted delivery can be manifested by dripping of water from a brew chamber or beverage/liquid outlet of the system after beverage formation is completed. For example, when making a beverage, cold water may be introduced to the heater tank, forcing heated water to exit the tank and travel to a brew chamber or other location for the formation of a beverage. Once delivery of cold water to the tank is stopped, such as when sufficient water has been delivered to form a beverage of a desired volume, the flow of heated water from the tank to the brew chamber or other outlet will also stop, signaling the end of beverage production. A user may remove a cup or other container with the finished beverage and leave the system for the later formation of another beverage. Once the formation of beverage is complete, the heater tank will initially contain at least some relatively cool, unheated water, and the system may operate to heat the water in preparation for forming another beverage. However, heating of the water will cause the water to expand, and if the heater tank has a fixed volume, this expansion may cause water to be delivered from the tank outlet to the brew chamber or other outlet. As a result, water may undesirably drip from the brew chamber outlet during water heating even though no beverage is being formed. This undesired liquid discharge may cause a mess, e.g., at a drip tray or other location where the liquid exits.

Systems such as that in U.S. Patent Application publication 2008/0134902 tend to not suffer from unwanted liquid discharge, e.g., because the reservoir in which water or other liquid is heated is vented and/or substantially emptied after beverage formation is complete. Similarly, a system like that in U.S. Pat. No. 7,398,726 may not suffer from unwanted liquid discharge because air, rather than liquid, is delivered to the tank to force the flow of heated water to the brew chamber or other outlet. This may substantially empty a conduit leading from the heater tank to the brew chamber, as well as provide a gas volume in the tank. As a result, when water is heated in the dispensing tank, expansion of the water may be accommodated by the gas volume in the tank and/or by the evacuated conduit leading from the tank outlet to the brew chamber. Thus, these systems tend not to have problems regarding the unwanted discharge of water due to heating expansion.

In one aspect of the invention, a beverage forming system that delivers heated liquid from a heater tank for discharge from the system by introducing liquid into the tank, e.g., to make a beverage, may operate to introduce air into the heater tank after liquid delivery is complete to evacuate a top portion of the tank of liquid and a conduit leading from a top of the tank to a brew chamber or other outlet. While systems like that in U.S. Pat. No. 7,398,726 introduce air into a heater tank to deliver heated water from the tank, such systems do not deliver heated liquid from the tank by introducing liquid into the tank. Also, in some embodiments in accordance with the invention, an outlet of the heater tank may be at an extreme top of the tank. Thus, by evacuating the top portion of the tank of liquid, unwanted discharge of liquid from the tank may be made more effective.

In another aspect of the invention, a beverage forming system may include a liquid supply arranged to provide a liquid for forming a beverage, a brew chamber arranged to hold a beverage medium for mixing with the liquid to form a beverage, and a heater tank arranged to heat liquid in the tank. The heater tank may have a top, a bottom, a liquid inlet to receive liquid from the liquid supply, an outlet at the top to provide heated liquid to the brew chamber for forming a beverage, and an expansion chamber at the top of the heater tank providing a tortuous flow path from an air inlet to the outlet. The tortuous flow path may be arranged to evacuate a top portion of the heater tank of liquid and provide a volume in the tank that helps resist unwanted discharge of water from the tank due to thermal expansion. The expansion chamber may be located within the heater tank, at least partially within the heater tank, or outside of the heater tank.

In one embodiment, an air inlet end of the expansion chamber flow path may be arranged to be lower than an outlet end of the flow path at the heater tank outlet. This arrangement may allow the expansion chamber to provide a well-controlled gas volume in the heater tank and/or help expel liquid from the expansion chamber and to the tank outlet during air purging of the expansion chamber. For example, by having the air inlet end positioned below the outlet end, air will tend to flow from the air inlet end toward the outlet end. This flow may help to at least partially evacuate the flow path as air flows from the air inlet end to the outlet end and displaces any liquid in the flow path. Also, any liquid in the tank will tend to enter the expansion chamber at the air inlet end rather than at the outlet end, e.g., because the liquid will tend to be heavier than air in the expansion chamber. As a result, any volume expansion of liquid will tend to initially enter the expansion chamber at the air inlet end, and subsequently flow toward the outlet end along the flow path with any further expansion. That is, liquid will tend to first fill (or at least partially or substantially fill) the expansion chamber before reaching the outlet of the heater tank. By providing the expansion chamber flow path with a desired volume, unwanted discharge of liquid from the tank due to thermal expansion can be resisted.

While the tortuous flow path of the expansion chamber may be arranged in a variety of shapes, such as square, rectangular, oval, zig-zag, and others, in one embodiment, the flow path of the expansion chamber may have a spiral shape. For example, the heater tank may have a cylindrical shape, and the expansion chamber may be arranged at a top of the tank. The air inlet end of the expansion chamber may be arranged near a cylindrical sidewall of the tank, and the outlet end (and outlet of the tank) may be arranged near a center, longitudinal axis of the tank. The flow path may follow a spiral shape from the air inlet end to the outlet, and may extend along any suitable arc length, such as extending along an arc of 90 degrees or more, e.g., 720 degrees or more, from the air inlet end to the outlet end. The flow path may be formed as a closed channel, with openings only at the air inlet and outlet ends, or may be formed in other ways, such as an open channel formed by wall elements that extend downwardly from a top of the tank. In one embodiment, the wall or other elements that form the expansion chamber may be molded or otherwise formed into a part of a lid or cap of the heater tank. The lid or cap may incorporate other elements, such as one or more conductive probes used to measure liquid levels in the tank, an air inlet to allow pressurized air into the tank, one or more sensors (e.g., for detecting temperature or other features), and so on.

In some embodiments, an air pump may be arranged to introduce air into the air inlet for flow through the expansion chamber and to the outlet. Thus, the air pump may be operated after liquid delivery from the tank is complete (e.g., introduction of cool, unheated water into the heater tank is stopped), and may serve to not only to at least partially remove liquid from the expansion chamber, but also help to remove liquid from a conduit leading from the tank outlet to a brew chamber or other beverage outlet. Therefore, the air pump and the expansion chamber may be arranged such that air introduced into the air inlet at least partially evacuates a top of the heater tank of liquid. Also, some beverage forming systems may use a cartridge to hold a beverage medium used to make a beverage by mixing heated liquid with the beverage medium in the cartridge. Air introduced into the tank by the air pump may also help to expel beverage from the cartridge, e.g., to help reduce dripping of beverage from the cartridge after beverage formation is complete.

Liquid may be introduced into the heater tank in a variety of different ways, and in one embodiment, the liquid inlet to the heater tank may be located near a bottom of the heater tank, e.g., in the tank bottom wall or sidewall near the bottom. Note, for example, that an inlet formed by a tube that extends from the tank top to the bottom so that liquid introduced into the tube exits the tube at the bottom of the tank forms an inlet located near a bottom of the tank.

The beverage forming system may include a liquid supply that is arranged in any suitable way to deliver liquid to the heater tank. For example, the liquid supply may include a storage tank fluidly coupled to an inlet of a pump, which has a fluid outlet fluidly coupled to the liquid inlet of the heater tank. Thus, the pump may be used to move water from the storage tank and into the heater tank to cause liquid discharge at the tank outlet. In one embodiment, the pump is a positive displacement pump, such as a syringe or diaphragm pump, controllable to deliver a known volume of liquid to the heater tank. For example, a diaphragm pump may be arranged so that a known volume of liquid, e.g., 5 ml of water, is delivered for each delivery stroke. As a result, by operating the pump through a desired number of cycles, a known volume of water or other liquid may be delivered to the tank, and thus from the tank to a brew chamber or other outlet.

In some embodiments, the brew chamber may be arranged to hold a beverage cartridge that contains a beverage medium, and the outlet of the heater tank may be fluidly coupled to an inlet of the brew chamber so that liquid is introduced into the beverage cartridge to form a beverage. For example, the inlet of the brew chamber may include a piercing element, such as a hollow needle, arranged to pierce a portion of the cartridge to form an opening through which liquid is delivered. Other arrangements are possible for introducing liquid to a beverage medium, such as having the beverage medium held in the brew chamber as is done in some drip coffee brewing systems. Thus, aspects of the invention are not necessarily restricted to cartridge-based beverage forming systems, but can be used in any suitable system type, including systems that dispense heated water only.

In another aspect of the invention, a method of forming a beverage includes heating liquid in the heater tank, providing a liquid to a heater tank via a liquid inlet, delivering liquid from the heater tank to a beverage medium to form a beverage via an outlet at a top of the heater tank, and introducing air into a tortuous flow path of an expansion chamber at the top of the heater tank after delivery of liquid to the heater tank is stopped to expel liquid from at least a portion of the expansion chamber. As discussed above, expelling liquid from at least a portion of an expansion chamber may help reduce or eliminate unwanted discharge of liquid from the heater tank, e.g., due to thermal expansion or other mechanisms, such as siphon-based flow.

While air may be introduced into the expansion chamber in a variety of ways, air may be introduced to the expansion chamber at an air inlet end of the flow path that is positioned below the outlet end of the flow path. Thus, introducing air at the air inlet may cause air to flow from the air inlet, through the tortuous flow path and to the outlet. The flow path may have any of a variety of tortuous or other shapes, such as a spiral shape. Other features discussed herein may be incorporated into a method of forming a beverage, including features regarding a liquid supply system, piercing of a beverage cartridge for introduction of liquid into the cartridge, and others.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
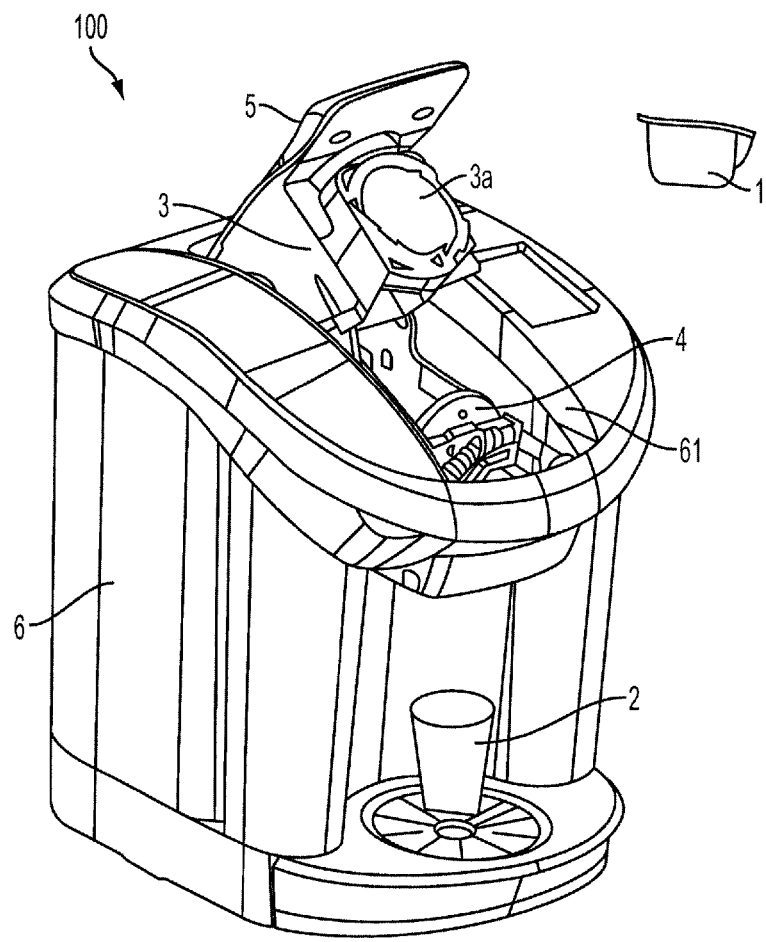
FIG. 1 is a perspective view of a beverage forming system with a cartridge holder in an open position in an illustrative embodiment.

FIG. 1 shows a perspective view of a beverage forming system 100. Although the beverage forming system 100 may be used to form any suitable beverage, such as tea, coffee, other infusion-type beverages, beverages formed from a liquid or powdered concentrate, soups, juices or other beverages made from dried materials, or other, in this illustrative embodiment, the system 100 is arranged to form coffee or tea beverages. As is known in the art, a beverage cartridge 1 may be provided to the system 100 and used to form a beverage that is deposited into a user's cup or other suitable container 2. The cartridge 1 may be manually or automatically placed in a cartridge receiver that includes a cartridge holder 3 and cover 4 of the beverage forming system 100. For example, the holder 3 may be or include a circular, cup-shaped or otherwise suitably shaped opening 3a in which the cartridge 1 may be placed. In this embodiment, the cartridge holder 3 includes an opening 3a that is arranged to receive the cartridge 1. With a cartridge 1 placed in the cartridge holder 3, a handle 5 may be moved by hand (e.g., downwardly) so as to move the cartridge holder 3 to a closed position in which the holder 3 is received into a cavity 61 of the housing 6. In the closed position, the cover 4 at least partially covers the opening 3a, e.g., to at least partially enclose the cartridge 1 in a space in which the cartridge is used to make a beverage. For example, with the cartridge 1 held by the cartridge holder 3 in the closed position, water or other liquid may be provided to the cartridge 1 (e.g., by injecting the liquid into the cartridge interior) to form a beverage that exits the cartridge 1 and is provided to a cup 2 or other container. Of course, aspects of the invention may be employed with any suitably arranged system 100, including drip-type coffee brewers, carbonated beverage machines, and other systems that deliver water from a tank.

Figure 2:
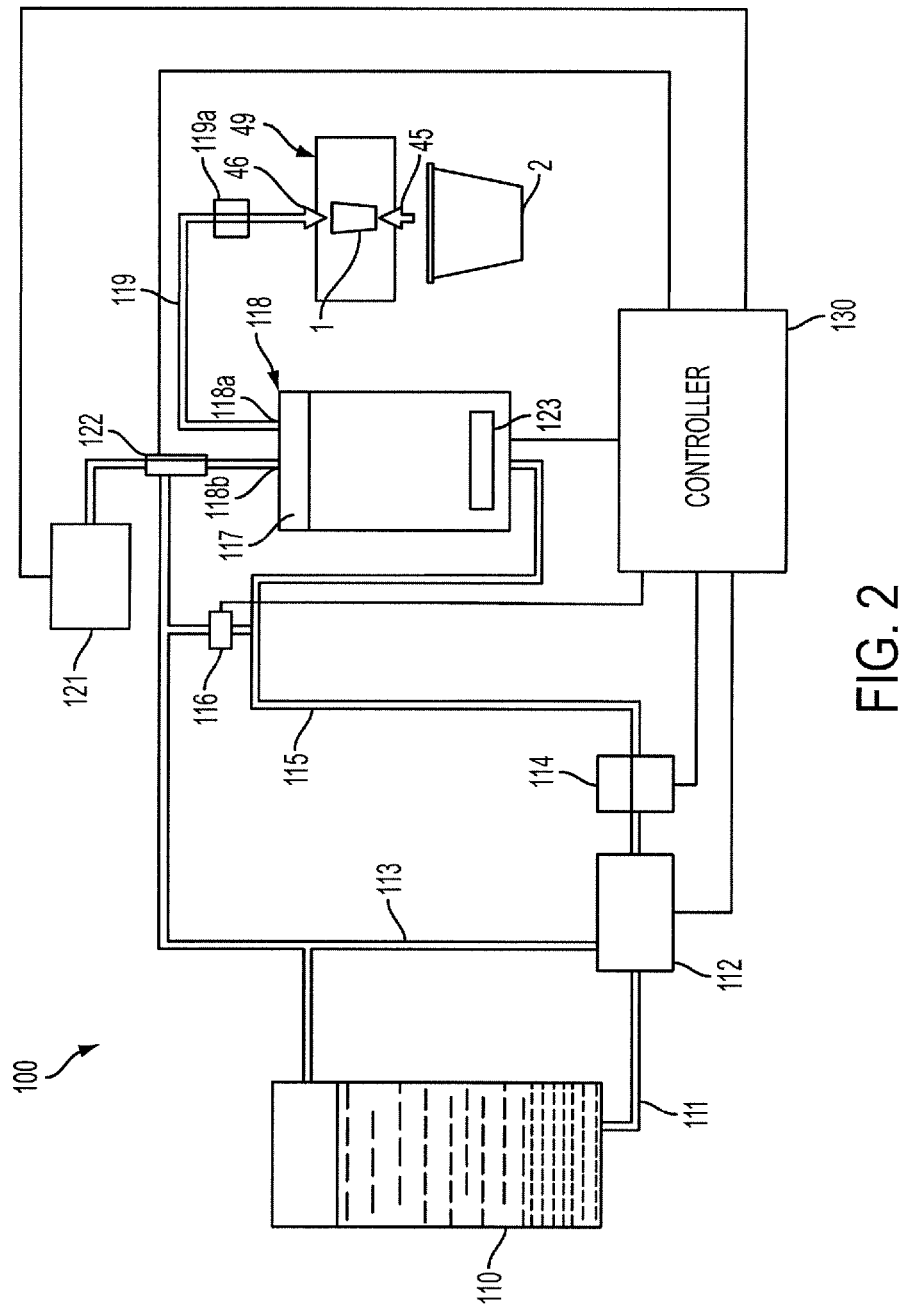
FIG. 2 is a schematic diagram of components of a beverage forming system in an illustrative embodiment.

FIG. 2 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other liquid may be provided to a cartridge 1 in a brew chamber 49 or to another beverage outlet by a liquid supply that, in this embodiment includes a storage tank 110, a supply conduit 111 fluidly connecting the storage tank 110 to an inlet of a pump 112 (such as a centrifugal pump, piston pump, solenoid pump, diaphragm pump, etc.), and a pump conduit 115 that is fluidly connected between the outlet of the pump 112 and a liquid inlet of the heater tank 118. This embodiment includes other optional features, such as a check valve 114 or other flow controller (such as an electronically-controlled valve) that can prevent backflow in the pump conduit 115 from the tank 118 to the pump 112, a pump conduit vent 116, which may include a controllable valve or fixed orifice, that allows a siphon in the pump conduit 115 to be broken as necessary, a priming conduit 113 that may be used to allow the pump 112 to be primed by venting the pump 112 to allow liquid to flow from the storage tank 110 to the pump, and others.

Operation of the water pump 112 and other components of the apparatus 100 may be controlled by a controller 130, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The heater tank 118 may be provided with a desired amount of liquid by any suitable technique, such as running the pump 112 for a predetermined time, detecting a flow rate or volume of liquid passing through the pump conduit 115 (e.g., at the flow controller 114), operating the pump 112 for a desired number of cycles (such as where the pump is arranged to deliver a known volume of liquid for each cycle), or using any other viable technique. At an initial operation or filling of the heater tank 118, the controller 130 may detect that the heater tank 118 is completely filled when a pressure sensor (not shown) detects a rise in pressure indicating that the water has reached the top of the heater tank 118, when a conductive probe detects the presence of liquid in an upper portion of the tank 118, when an optical sensor detects a presence of liquid in the tank conduit 119, and others. Alternately, the controller 130 may not detect whether the tank 118 is filled or not, and simply assume that the tank 118 is filled once a first fill operation is completed, e.g., by operating the pump 112 for a time or number of cycles that is known to fill the tank 118.

Water in the tank 118 may be heated by way of a heating element 123 whose operation is controlled by the controller 130 using input from a temperature sensor or other suitable input. Water in the heater tank 118 may be dispensed via the heater tank conduit 119 to a brew chamber 49 or other beverage forming station or outlet. Liquid may be discharged from the heater tank 118 by the pump 112 operating to force additional unheated liquid into the tank 118, thereby displacing water out of the tank 118 and to the brew chamber 49. A flow sensor or other suitable device may be used to determine the amount of liquid delivered to the tank 118, and thus the amount of liquid delivered to the brew chamber. Alternately, the pump 112 may be a piston-type, diaphragm-type or other pump arranged such that a known volume of liquid may be delivered from the pump 112 to the tank 118, thus causing the same known volume to be delivered to the brew chamber 49. Thus, a specified volume of liquid may be delivered to the brew chamber 49 by operating the pump 112 to deliver the specified volume of liquid to the tank 118, e.g., a diaphragm pump may deliver 5 ml for each pump stroke, and thus 100 ml of liquid may be delivered to the tank 118 by operating the pump through 20 pump cycles. Liquid may be introduced into the cartridge 1 at any suitable pressure, e.g., 1-2 psi or higher. Although in this embodiment the tank conduit 119 is shown as connected simply to the top of the tank 118 at an outlet of the tank 118 without extending into the tank at all, the conduit 119 could be arranged in other suitable ways. The outlet of the heater tank 118 could be arranged at an extreme top of the tank 118, or in other ways in other embodiments, e.g., at the top of the tank 118 but below the extreme top portion of the tank 118. The tank conduit 119 may include a check valve 119a or other flow controller, e.g., to help prevent backflow in the tank conduit 119 from the brew chamber 49 to the tank 118.

The brew chamber 49 may include any beverage making ingredient, such as ground coffee, tea, a flavored drink mix, or other beverage medium, e.g., contained in a cartridge 1 or not. Alternately, the brew chamber 49 may function simply as an outlet for heated water, e.g., where a beverage medium is contained in a user's cup 2. Once liquid delivery by the pump 112 to the tank 118 is complete, an air pump 121 may be operated to force air into the top of the tank 118 and/or into the conduit 119 to purge a top portion of the tank 118, the conduit 119 and/or cartridge 1 of liquid, at least to some extent. As described in more detail below, an expansion chamber 117 associated with the tank 118 may receive air from the air pump 121 and provide a liquid-free volume at a top of the heater tank 118, e.g., to help prevent unwanted discharge of liquid from the tank 118. A valve 122 may be used to control air flow into and/or out of the tank 118.

While in this illustrative embodiment, a liquid supply system arranged to provide liquid to a beverage outlet (at the brew chamber 49) may include a pump 112, storage tank 110 and other components, these components are not necessarily required and/or other components may be included. For example, a check valve 114, flow meter, vent valve 116 (e.g., to help prevent the formation of a siphon), etc., may be included with the liquid supply. Alternately, other mechanisms for providing liquid may be used, such as by gravity flow of liquid, flow forced by air pressure, or other motive force to move liquid from a storage tank 110, flow of liquid from a plumbed or other "city water" supply, and others.

For those systems employing a cartridge 1, once a cartridge is located in the brew chamber 49 in the closed position, the beverage forming system 100 may use the cartridge 1 to form a beverage. For example, one or more inlet needles 46 associated with the cover 4 or other part of the system 100 may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The cover 4 or other portion of the system 100 may also include one or more outlet needles 45 or other elements to puncture or pierce the cartridge 1 at an outlet side to permit the formed beverage to exit the cartridge 1. Other inlet/outlet piercing arrangements are possible, such as multiple needles, a shower head, a non-hollow needle, a cone, a pyramid, a knife, a blade, etc. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, a lid or other portion of a cartridge may be pierced, or otherwise effectively opened for flow, by introducing pressure at an exterior of the lid. For example, a water inlet may be pressed and sealed to the lid exterior and water pressure introduced at the site. The water pressure may cause the lid to be pierced or otherwise opened to allow flow into the cartridge 1. In another arrangement, the cartridge lid may include a valve, conduit or other structure that opens when exposed to a suitable pressure and/or when mated with a water inlet tube or other structure. As with the inlet piercing arrangement, the outlet piercing arrangement may be varied in any suitable way. Thus, the outlet piercing element 45 may include one or more hollow or solid needles, knives, blades, tubes, and so on. Alternately, the cartridge 1 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 45 remains in place to receive beverage as it exits the opening formed in the cartridge. However, in other embodiments, the piercing element 45 may withdraw after forming an opening, allowing beverage to exit the opening and be received without the piercing element 45 being extended into the cartridge 1. Other arrangements for a beverage outlet are possible however, e.g., the cartridge may have a permeable portion that allows beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

Figure 3:
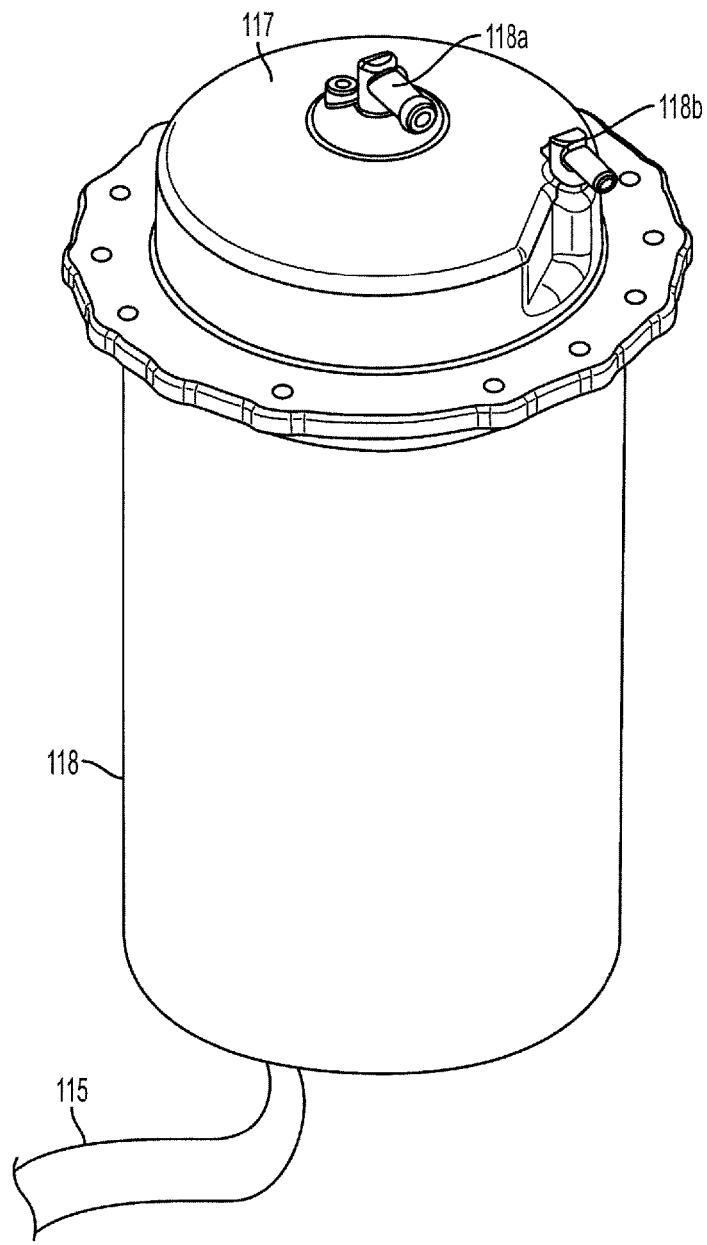
FIG. 3 shows a perspective view of a heater tank and expansion chamber in an illustrative embodiment.
Figure 4:
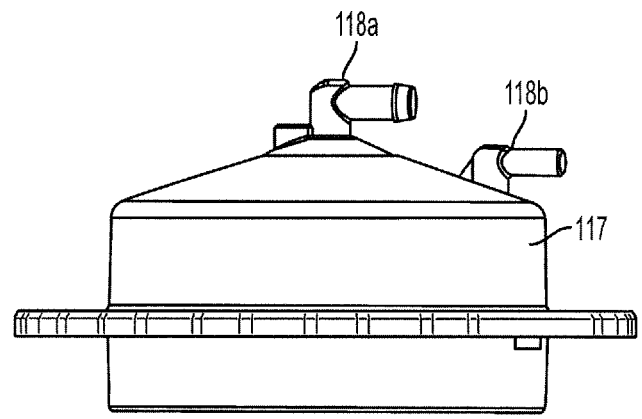
FIG. 4 is a side view of the expansion chamber in an illustrative embodiment.
Figure 5:
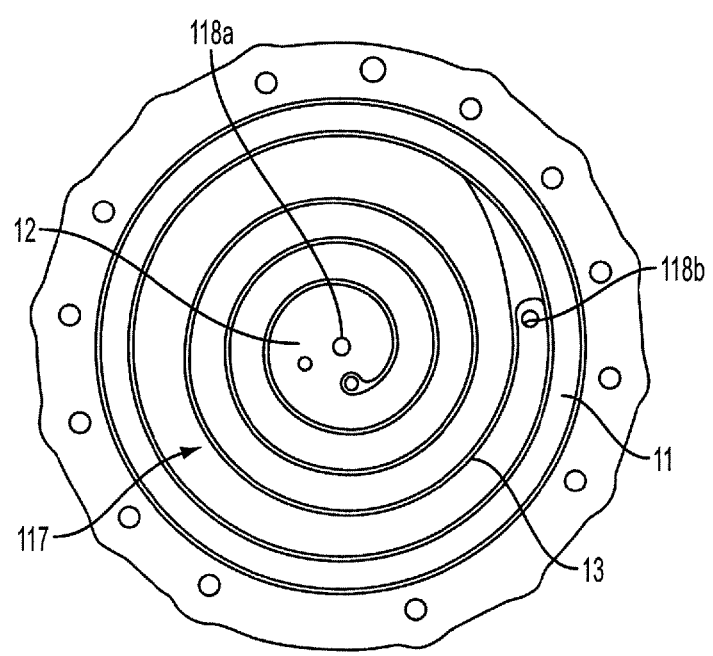
FIG. 5 is a bottom view of the expansion chamber of FIG. 4.
Figure 6:
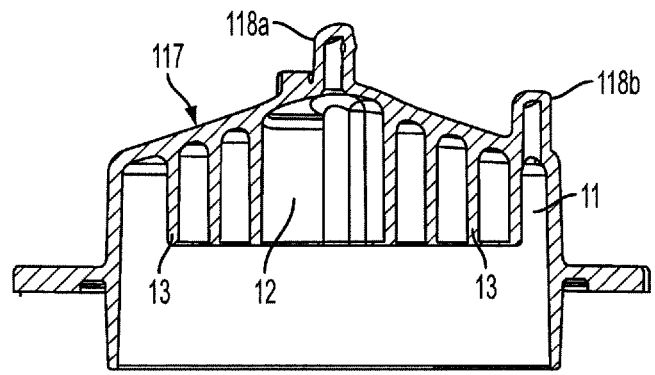
FIG. 6 is a cross-sectional side view of the expansion chamber of FIG. 4.
Figure 7:
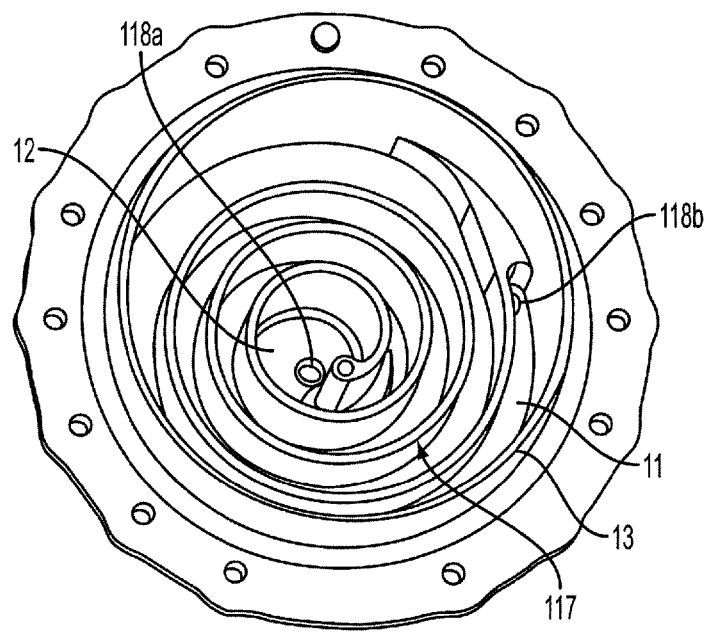
FIG. 7 is a bottom perspective view of the expansion chamber of FIG. 4.

FIG. 3 shows a top perspective view of the heater tank 118 and the expansion chamber 117 in an illustrative embodiment. FIG. 4 shows a side view of the top portion (e.g., a lid or cap) of the heater tank 118 separated from a lower portion of the tank 118. While in this embodiment the tank 118 is formed in two parts, e.g., a lid or cap portion at the top which is joined by a flange connection to a lower portion of the tank 118, the tank 118 could be formed in any suitable way, such as in one piece, or in three or more parts. FIGS. 5-7 show bottom, cross-sectional and bottom perspective views of the cap portion shown in FIG. 4. The expansion chamber 117 in this embodiment includes a flow path that extends from an air inlet end 11, which communicates with an air inlet 118b, to an outlet end 12, which communicates with the outlet 118a of the tank 118. In this embodiment, the flow path has a tortuous shape in the form of a spiral, but other arrangements are possible, such as zig-zag paths, circular paths, rectangular paths, etc. The flow path of the expansion chamber 117 is formed in this embodiment by wall elements 13 that extend downwardly from a top wall of the tank 118. As can be seen in FIG. 6, the wall elements 13 and the top wall of the tank 118 are arranged so that the air inlet end 11 of the flow path is located below the outlet end 12. In this way, if the flow path is filled with liquid, air introduced at the air inlet end 11 will tend to flow along the flow path toward the outlet end 12, displacing liquid in the flow path as the air travels. If air is continuously introduced at the air inlet end 11 (e.g., via the air inlet 118b), the flow path may be at least partially filled with air, e.g., to provide a space into which expanding liquid volume may be received without expelling liquid from the outlet of the tank 118. Also, when the expansion chamber 117 is filled with air and the tank 118 has additional liquid introduced into the tank 118, the liquid will tend to enter the expansion chamber 117 at the air inlet end 11, and flow along the flow path toward the outlet 118a. As the liquid flows into the flow path, air in the expansion chamber 117 may be displaced (e.g., forced to exit the tank outlet 118a) in a controlled way such that liquid does not exit the tank at the outlet 118a until all, or substantially all, of the air is removed from the tank 118.

It should be appreciated that other arrangements for the expansion chamber 117 aside from being formed by depending wall elements 13 are possible. For example, the expansion chamber 117 may be formed by a tubular element (e.g., having a circular, rectangular, oval or other cross-section) that extends from the tank outlet 118a. The tubular element may be shaped to provide a tortuous flow path, e.g., in the form of a spiral, rectangle, circle, or other shape. An air inlet end 11 of the tubular element may be arranged to both communicate with an air inlet 118b such that an air pump 121 or other component may provide air into the flow path of the tubular element, and communicate with the tank 118 to receive liquid from the tank 118. For example, the tubular element could have a "Y" connection at the air inlet end 11, with one portion of the "Y" communicating with the air inlet 118b and the other portion of the "Y" communicating with the tank 118 interior. Other configurations for the expansion chamber 117 are possible, including arrangements where a portion of the expansion chamber 117 is positioned outside of the tank 118. For example, a spirally-shaped tubular element could be arranged on the top wall of the tank 118 so as to function in a manner identical to that in FIGS. 4-7. The outlet end 12 of the flow path may be fluidly coupled to the outlet 118a at a location outside of the tank 118.

In addition to providing a volume into which an expanding volume of liquid may enter, the expansion chamber 117 may enable other features for the beverage forming system. For example, the system 100 may operate to intermittently introduce air into the expansion chamber 117 at intervals while liquid is being delivered to the tank 118 (and therefore to the brew chamber 49). This may allow air to be intermittently delivered to the brew chamber 49, which as is known in the art, may be employed to induce foam production or otherwise introduce air into a beverage being produced. That is, slugs of air may be introduced at the air inlet end 11 of the expansion chamber while liquid is being delivered from the tank 118. These slugs of air may travel along the flow path of the expansion chamber until reaching the tank outlet 118a, upon which the slugs will exit from the tank 118. The configuration of the expansion chamber 117 may allow for controlled volume slugs being introduced into the liquid flow from the tank 118 at desired intervals so as to have a desired effect on beverage production.

While aspects of the invention may be used with any suitable cartridge, or no cartridge at all, some cartridges may include features that enhance the operation of a beverage forming system 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of forming a beverage comprising:
providing a liquid to a heater tank via a liquid inlet;
heating liquid in the heater tank;
delivering liquid from the heater tank to a beverage medium to form a beverage via an outlet at a top of the heater tank; and
introducing air into a tortuous flow path of an expansion chamber at the top of the heater tank after delivery of liquid to the heater tank is stopped to expel liquid from at least a portion of the expansion chamber.

2. The method of claim 1, wherein the step of introducing air includes introducing air at an air inlet end of the expansion chamber that is positioned below an outlet end of the expansion chamber.

3. The method of claim 1, wherein the step of introducing air includes introducing air at an air inlet end that flows from the air inlet end, through the tortuous flow path and to an outlet end.

4. The method of claim 1, wherein the flow path of the expansion chamber has a spiral shape.

5. The method of claim 1, wherein the step of introducing air includes operating an air pump arranged to introduce air into an air inlet for flow through the tortuous flow path of the expansion chamber and to the outlet.

6. The method of claim 1, wherein the step of introducing air includes introducing air into an air inlet to at least partially evacuate a top of the heater tank of liquid.

7. The method of claim 1, wherein the step of introducing air includes providing a gas volume at the top of the heater tank to help prevent exit of liquid from the heater tank due to expansion of liquid during heating.

8. The method of claim 1, wherein the liquid inlet is located near a bottom of the heater tank.

9. The method of claim 1, wherein the step of providing liquid includes delivering liquid from a storage tank to an inlet of a pump, and delivering liquid from an outlet of the pump to the liquid inlet of the heater tank.

10. The method of claim 8, wherein the pump is a positive displacement pump controllable to deliver a known volume of liquid to the heater tank.

11. The method of claim 1, wherein the step of delivering liquid includes delivering liquid to an inlet of a brew chamber arranged to deliver liquid to a beverage cartridge holding the beverage medium to form a beverage.

12. The method of claim 11, further comprising piercing the beverage cartridge with a portion of the inlet of the brew chamber to form an opening through which liquid is delivered to the beverage cartridge.

13. The method of claim 12, wherein a lid of the beverage cartridge is pierced to form the opening.

* * * * *